US012482980B2

(12) United States Patent
Zhang et al.

(10) Patent No.: US 12,482,980 B2

(45) Date of Patent: Nov. 25, 2025

(54) ELECTRICAL CONNECTOR ASSEMBLY WITH A PLURALITY OF TRANSMISSION UNITS

(71) Applicants: FU DING PRECISION INDUSTRIAL (ZHENGZHOU) CO., LTD., Zhengzhou (CN); FOXCONN INTERCONNECT TECHNOLOGY LIMITED, Grand Cayman (KY)

(72) Inventors: Xian-Liang Zhang, Kunshan (CN); Qin-Xin Cao, Kunshan (CN); Wen-Bo Zhao, Kunshan (CN); Yen-Chih Chang, New Taipei (TW); Yu-San Hsiao, New Taipei (TW); Shih-Wei Hsiao, New Taipei (TW); Yu-Ke Chen, Kunshan (CN)

(73) Assignees: FUDING PRECISION INDUSTRY (ZHENGZHOU) CO., LTD., Zhengzhou (CN); FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 492 days.

(21) Appl. No.: 17/870,121

(22) Filed: Jul. 21, 2022

(65) Prior Publication Data

US 2023/0033854 A1 Feb. 2, 2023

(30) Foreign Application Priority Data

Jul. 27, 2021 (CN) ........................ 202110849757.8

(51) Int. Cl.
*H01R 13/514* (2006.01)
*H01R 12/73* (2011.01)

(52) U.S. Cl.
CPC ......... *H01R 13/514* (2013.01); *H01R 12/737* (2013.01)

(58) Field of Classification Search
CPC ............................ H01R 12/737; H01R 13/514
USPC .......................................................... 439/634
See application file for complete search history.

(56) References Cited

U.S. PATENT DOCUMENTS

| | | | | |
|---|---|---|---|---|
| 7,070,446 | B2 * | 7/2006 | Henry .................. | H01R 13/659 439/541.5 |
| 7,918,683 | B1 * | 4/2011 | Hamner ................. | H01R 12/87 439/377 |
| 8,123,560 | B2 * | 2/2012 | McAlonis ............ | H01R 13/514 439/607.23 |
| 8,292,629 | B2 * | 10/2012 | McAlonis ............ | H01R 12/722 439/65 |
| 9,935,384 | B1 * | 4/2018 | Li ...................... | H01R 13/6335 |
| 10,006,826 | B2 | 6/2018 | Tsubata et al. | |

(Continued)

FOREIGN PATENT DOCUMENTS

CN 114447681 A 5/2022

*Primary Examiner* — Harshad C Patel
(74) *Attorney, Agent, or Firm* — Ming Chieh Chang

(57) ABSTRACT

An electrical connector assembly includes: a first frame defining plural accommodating cavities; plural transmission units partially received in the accommodating cavities, respectively, each of the transmission units comprising a card edge connector received in a corresponding accommodating cavity, a motherboard connector, and a circuit board connected with the card edge connector and the motherboard connector; and a second frame attached to the first frame; wherein the second frame presses against and hold the circuit boards in position.

15 Claims, 9 Drawing Sheets

(56) References Cited

U.S. PATENT DOCUMENTS

| | | | | |
|---|---|---|---|---|
| 10,020,603 | B1 | 7/2018 | Liu et al. | |
| 10,826,212 | B2 * | 11/2020 | Chen .................. | H01R 12/7005 |
| 11,637,390 | B2 * | 4/2023 | Zerebilov ............ | H01R 12/724<br>439/607.2 |
| 11,735,852 | B2 * | 8/2023 | Cartier, Jr. ........... | H01R 12/775<br>439/77 |
| 12,088,028 | B2 | 9/2024 | Lin | |
| 2022/0140513 | A1 | 5/2022 | Hsiao et al. | |
| 2024/0145958 | A1 * | 5/2024 | Fan ...................... | H01R 12/724 |

* cited by examiner

ELECTRICAL CONNECTOR ASSEMBLY WITH A PLURALITY OF TRANSMISSION UNITS

BACKGROUND OF THE INVENTION

1. Field of the Invention

The present invention relates to an electrical connector assembly, and particularly to an electrical connector assembly having improved retained elements to prevent a circuit board from falling off.

2. Description of Related Arts

U.S. Patent Application Publication No. 20220140513 discloses an electrical connector assembly, which includes a card edge connector, a motherboard connector, and an adapter board connected to the card edge connector and the motherboard connector. The card edge connector includes an insulative housing and a plurality of terminals retained in the insulative housing. The insulative housing defines a card slot receiving the adapter board and a pair of bumps extending into the card slot. The adapter board defines a pair of recesses. When the adapter board is inserted into the card slot, the bumps are stuck into the recesses to hold and prevent the adapter board from falling. However, the size of the bumps and the recesses are limited, resulting in unreliable fixing of the adapter board.

SUMMARY OF THE INVENTION

An object of the present invention is to provide an electrical connector assembly with improved retained elements.

In order to achieve above-mentioned object, an electrical connector assembly comprises: a first frame defining a plurality of accommodating cavities; a plurality of transmission units partially received in the accommodating cavities, respectively, each of the transmission units comprising a card edge connector received in a corresponding accommodating cavity, a motherboard connector, and a circuit board connected with the card edge connector and the motherboard connector; and a second frame attached to the first frame; wherein the second frame presses against and hold the circuit boards in position.

Other objects, advantages and novel features of the present invention will become more apparent from the following detailed description of the present embodiment when taken in conjunction with the accompanying drawings.

DETAILED DESCRIPTION OF THE PREFERRED EMBODIMENTS

Figure 1:
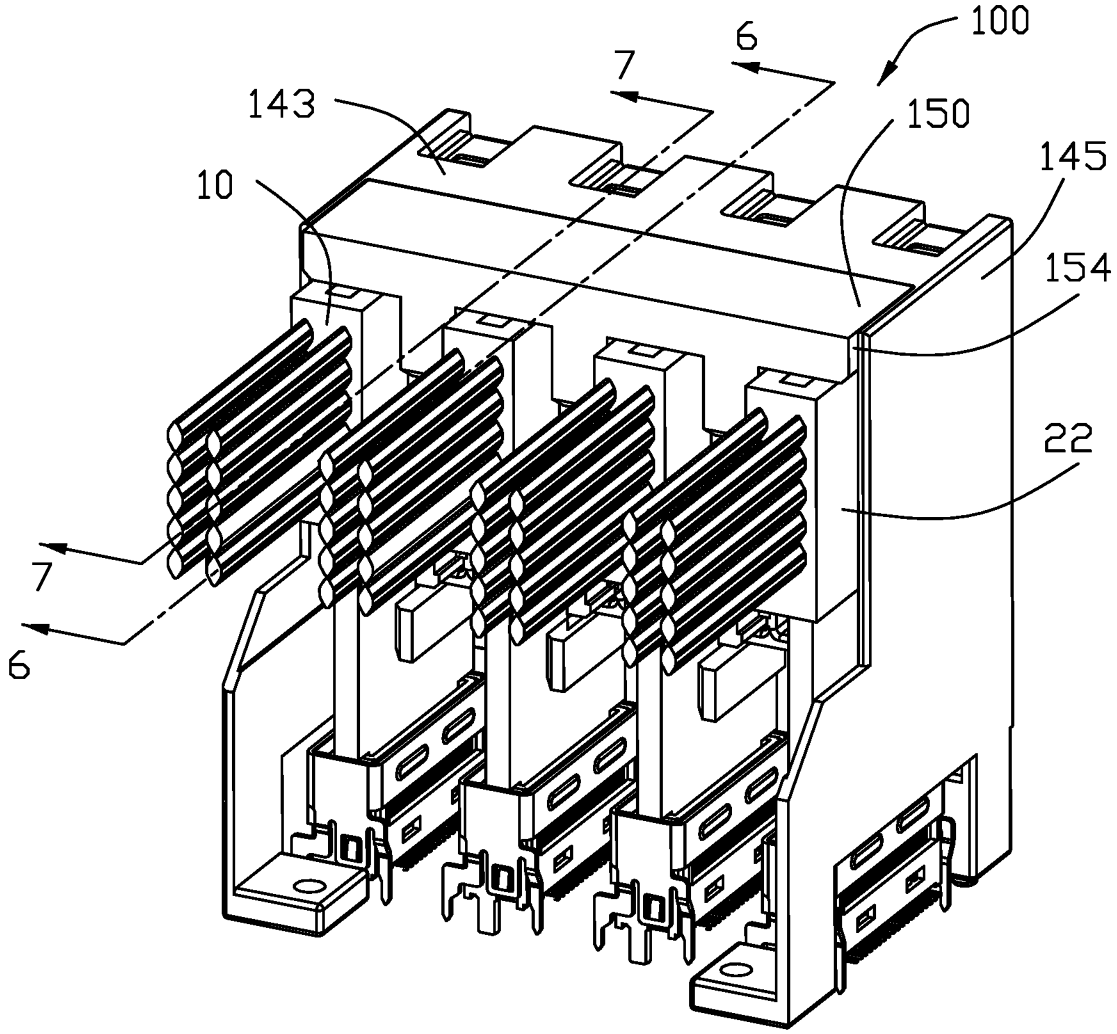
FIG. 1 is a perspective view of an electrical connector assembly with the present invention.

Reference will now be made to the drawing figures to describe a preferred embodiment of the present invention in detail.

Figure 2:
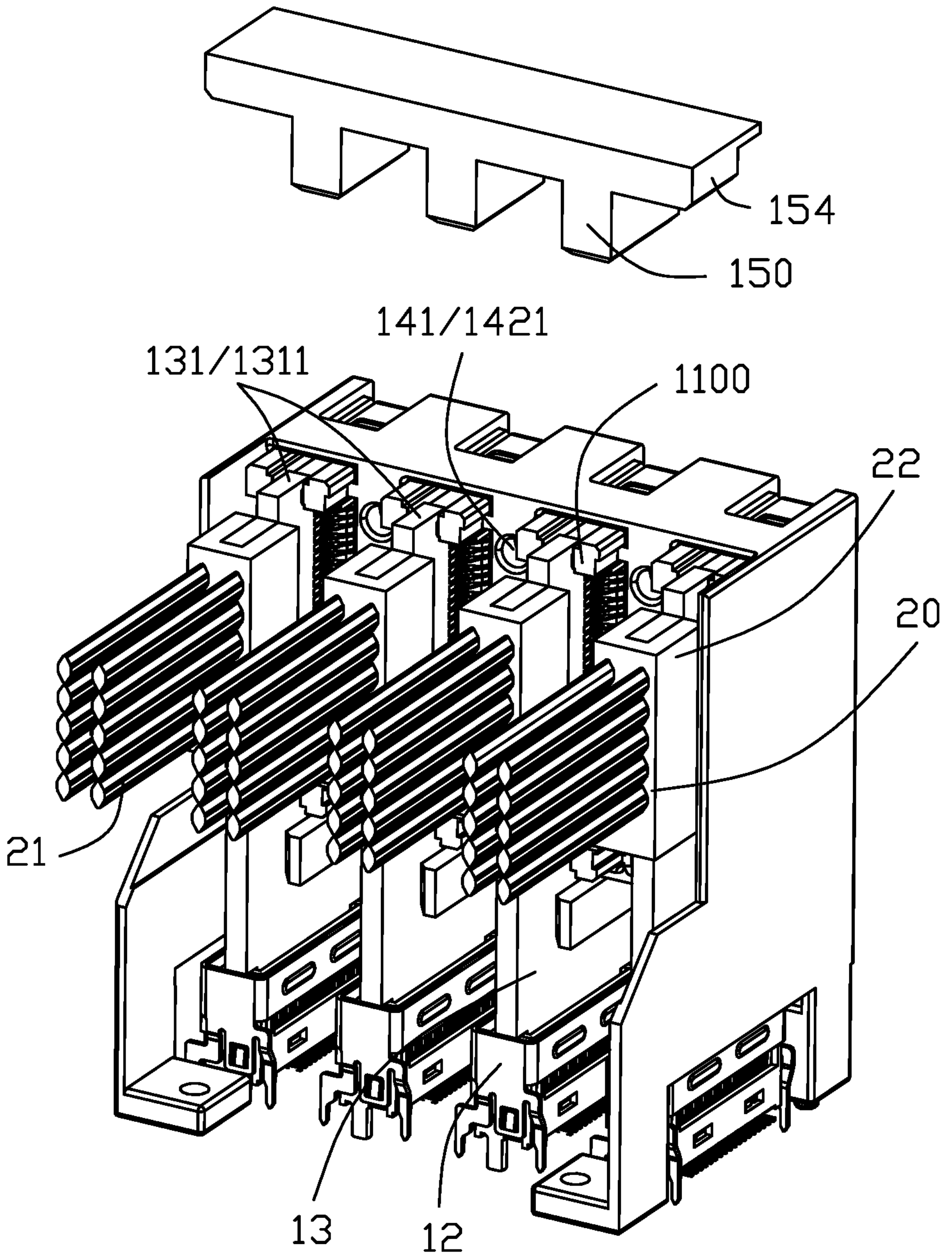
FIG. 2 is a perspective view of the electrical connector assembly of FIG. 1 before the second frame is installed.
Figure 3:
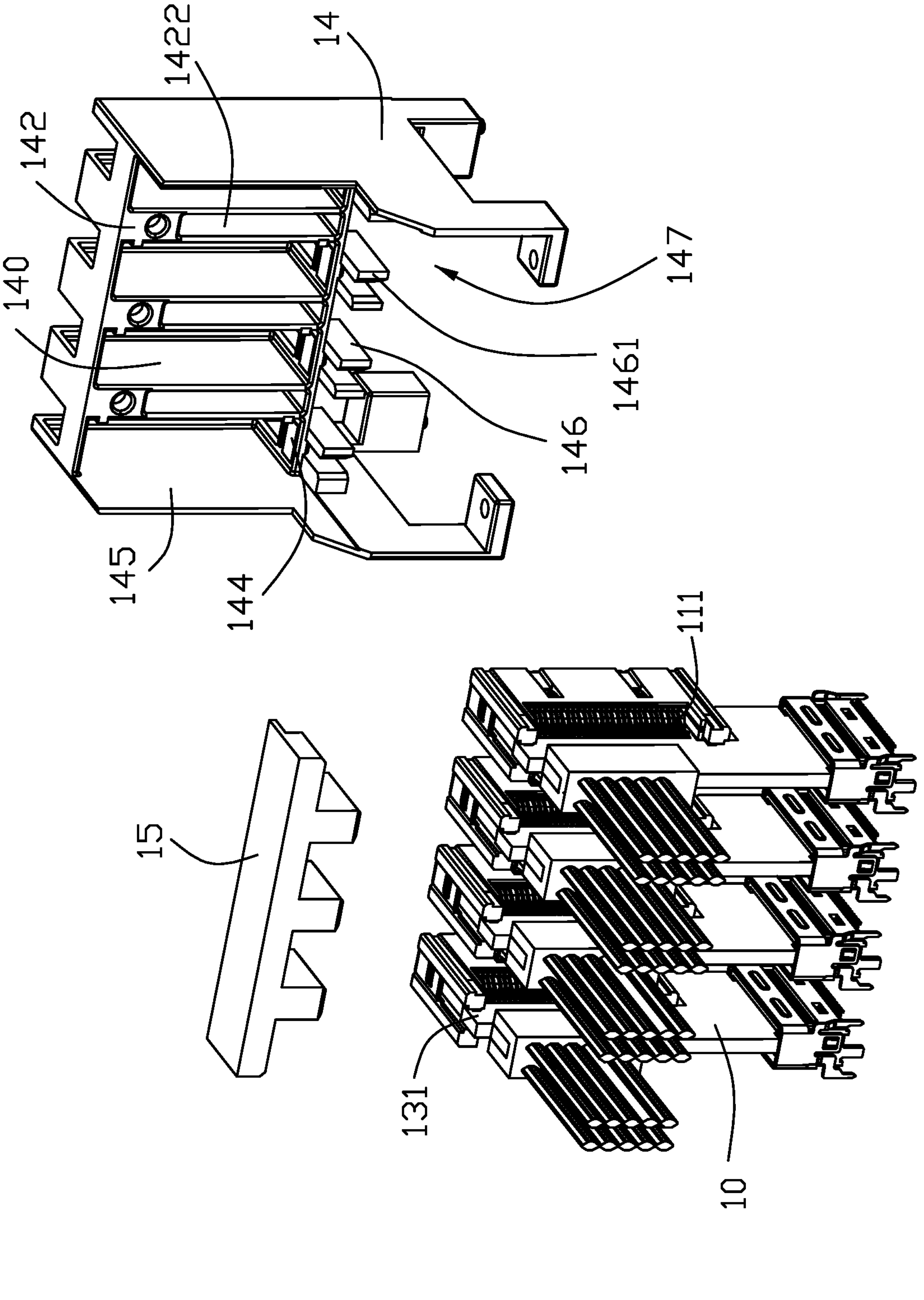
FIG. 3 is an exploded perspective view of the electrical connector assembly of FIG. 1.
Figure 4:
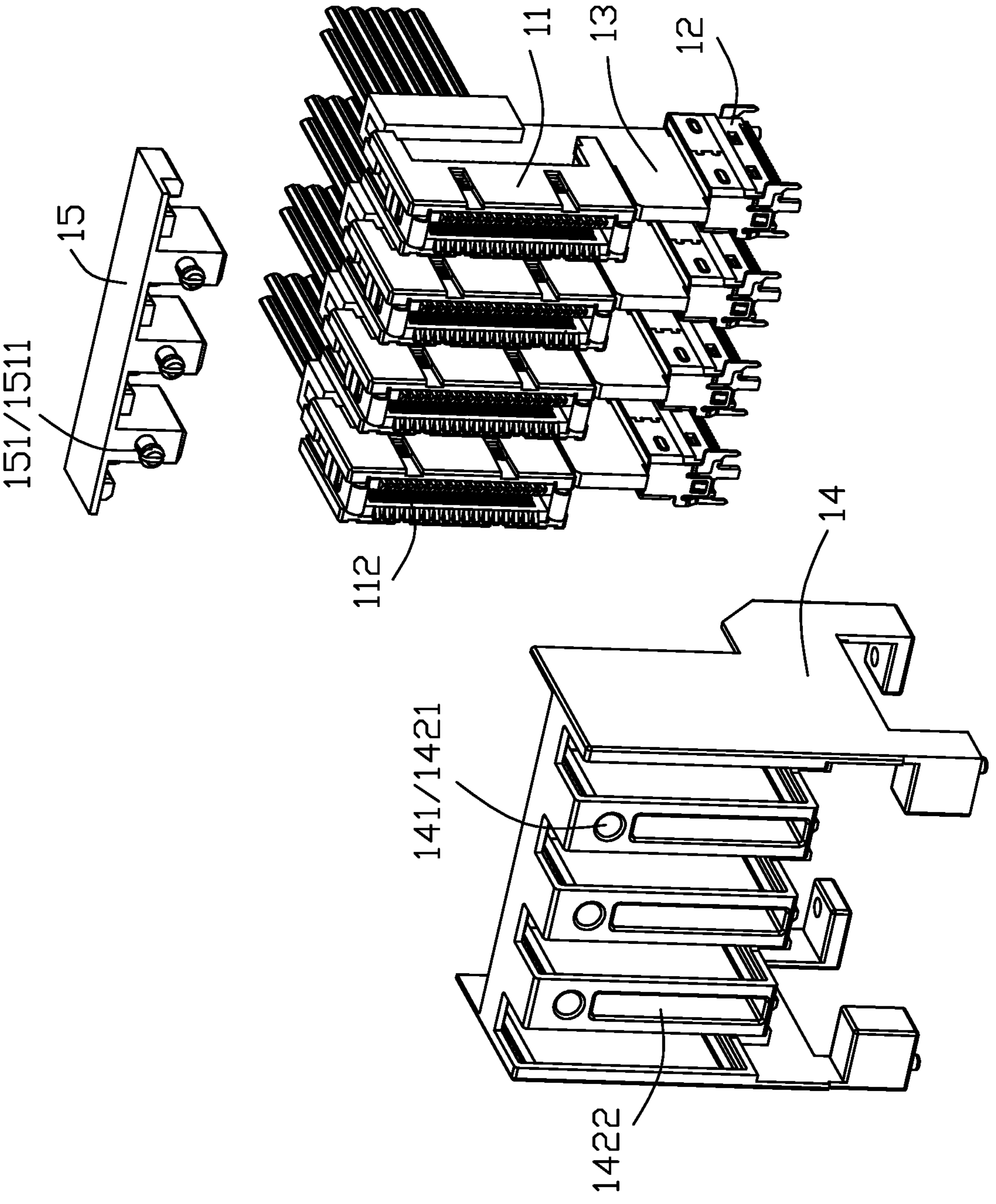
FIG. 4 is another perspective view of the electrical connector assembly of FIG. 3.
Figure 5:
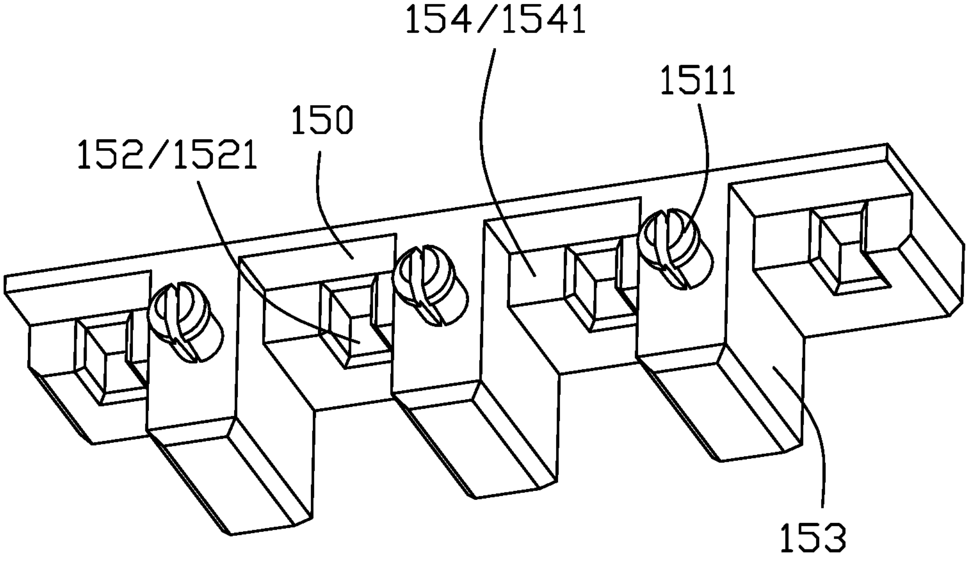
FIG. 5 is a perspective view of the second frame of FIG. 2.
Figure 6:
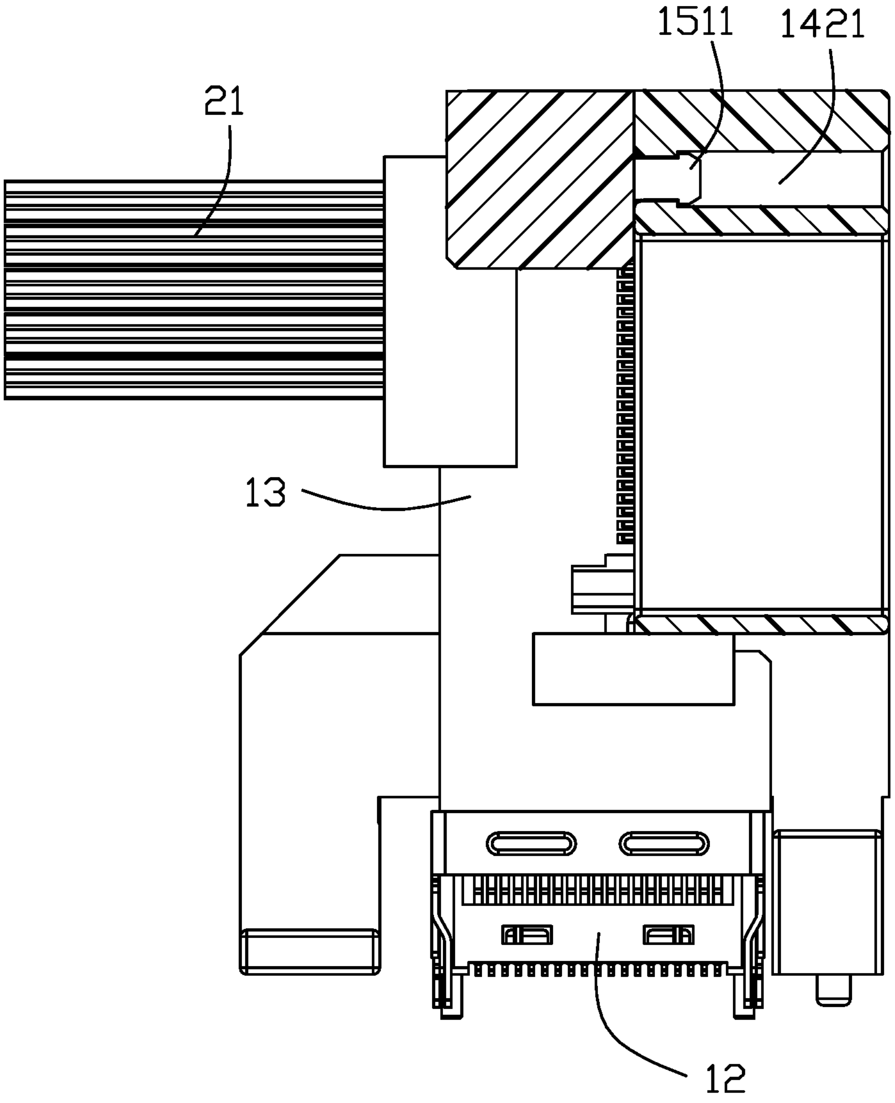
FIG. 6 is a cross-sectional view of the electrical connector assembly of FIG. 1 taken along line 6-6.

Referring to FIGS. 1-4, an electrical connector assembly 100 which is used for electrically connecting an electrical card (not shown in the figures) to a motherboard circuit board (not shown in the figures). The electrical connector assembly 100 includes a plurality of transmission units 10. Each transmission unit 10 includes a card edge connector 11 arranged vertically, and a motherboard connector 12 and a circuit board 13 which extends vertically and connects with the card edge connector 11 and the motherboard connector 12. The card edge connector 11 defines a rear card slot 111 to receive the circuit board 13 and a front card slot 112. The electrical connector assembly 100 further includes a first frame 14 and a second frame 15. The first frame 14 defines a plurality of accommodating cavities 140. The second frame 15 is assembled to the first frame 14 to prevent the circuit board 13 from falling out of the card slot 111, which used to be an improved retained element. The card edge connector 11 is located at a top front end of circuit board, and the card edge connector 11 at least partially overlaps with the motherboard connector 12 in a vertical direction. The two sides of the circuit board 13 respectively connected to the card edge connector 11 and the motherboard connector 12 are in an orthogonal relationship. In this embodiment, the circuit board 13 is assembled to the card edge connector 11 in a first direction, i.e., inserted forwards. Referring to FIGS. 2 and 4-5, in order to facilitate a fixing process of the second frame 15 to the first frame 14, the first frame 14 has a first locking portion 141, and the second frame 15 has a second locking portion 151. The second locking portion 151 is locked with the first locking portion 141 to fix the second frame 15 with the first frame 14. The circuit board 13 has a first stop portion 131 protruding upwards at a top edge thereof. The second frame 15 has a second stop portion 152. The second stop portion 152 presses forward against the first stop portion 131. The accommodating cavity 140 goes through along the first direction and a second direction opposite to the first direction. The first frame 14 further has a partition portion 142 between the neighboring accommodating cavities 140. The second frame 15 has a longitudinal base 150 extending transversely perpendicular to the circuit board 13 and a plurality of protruding ribs 153 which extends downward from the longitudinal base 150 and are opposite to the partition portion 142 along the first and second directions. The first locking portion 141 is in a form of plural latching holes 1421 on the partition portions 142 and the second locking portions is in a form of plural of latching hooks 1511 on the protruding ribs 153. Alternatively, the first locking portion 141 on the first fame 14 is in a form of latching hook while the second locking portion is a form of the latching holes on the protruding ribs 153. When the second frame 15 is inserted forward from a rear side of the assembly, the latching hooks 1511 is directly inserted into and retained in the latching holes 1421, and the protruding ribs 153 abut against the partition portions 142. In this embodiment, the ribs 153 unitarily underneath the longitudinal base 150 make the second frame 15 more solid and increase an overall thickness of the second frame 15 in the upper and lower directions which make an installation of the second frame 15 to the first frame 14 more convenient. The latching hook 1511 is substantially of a mushroom shape, and is composed of two symmetrical hook units. In addition, in order to facilitate a heat dissipation of the card edge connector 11, the first frame 14 defines a heat dissipation groove 1422 below the latching hole 1421 and opening through the partition portion 142 along the first and second directions.

Referring to FIGS. 1-7, the card edge connector 11 includes a card insulative housing 110 and a plurality of terminals retained in the card insulative housing 110. The first frame 14 includes an upper wall 143, a lower wall 144 and two side walls 145 located at both ends of the upper and lower walls 143, 144 and extend downwards to define a receiving space 147 below the accommodating cavities 140. The upper and lower walls 143, 144 extend laterally and are disposed opposite to each other. A pair of supporting portions 1100 extends rearwards from the card insulative housing 110 to sandwich a front end of the circuit board 13 and the supporting portions 1100 extend rearwards beyond the first frame 14. The support portion 1100 projects rearwards beyond the upper wall 143. The second frame 15 is mounted to the first frame 14 after the circuit board 13 is inserted in the rear card slot 111, and the second frame 15 is located between the two side walls 145. The upper surface of the longitudinal base 150 is flush with the upper surface of the upper wall 143. As seen, the second frame 15 further presses forwards against the support portions 1100 to limit the card insulative housing 110. In this embodiment, the longitudinal base 150 of the second frame 15 defines a recess 154 at a front face thereof and proximately to each side of the rib 153, the recess 15 opens forward and downwards and defining a step face 1541 orienting forward. The recesses 154 and the protruding ribs 153 are arranged alternately. The longitudinal base 150 further defines a U-shaped groove 1521 recessed from the stop face 1541 which opens forwards and downward. The grooves 1521 are functioned as the second stop portions 152. The first stop portion 131 is in a form of a protrusion 1311 protruding upward from the top edge of the circuit board 13 and protrudes into the U-shaped groove 1521. In this embodiment, the first frame 14 is made of metal material, and the second frame 15 is made of insulating material, such as plastic and rubber, etc.

The transmission unit 10 further includes a cable connector 20 connecting with an upper rear edge of the circuit board 13 and away from the rear card slot 111. The cable connector 20 includes cables 21 connected to a rear row of golden fingers defined on the circuit board 13 and a cable insulative body 22 fixed on the circuit board 13. The lower surface of longitudinal base 150 presses downward against cable insulative body 22. The cable connector 20 can transmit some high frequency signals to the main circuit board (not shown in the figures) through the cables 21. Therefore, the signal transmission between the external electronic card and the main circuit board can not only be directly transmitted through the circuit board 13 when the signal is in low-frequency, but the signals can also be transmitted through the cables 21 when the signal is high-frequency, so as to improve the signal transmission efficiency. Referring to FIG. 2, when the circuit board 13 is inserted into the rear card slot 111 to a predetermined position along the first direction, the first stop portions 131 press against the card insulative housing 110 along the first direction to prevent excessive insertion of the circuit board 13.

Figure 7:
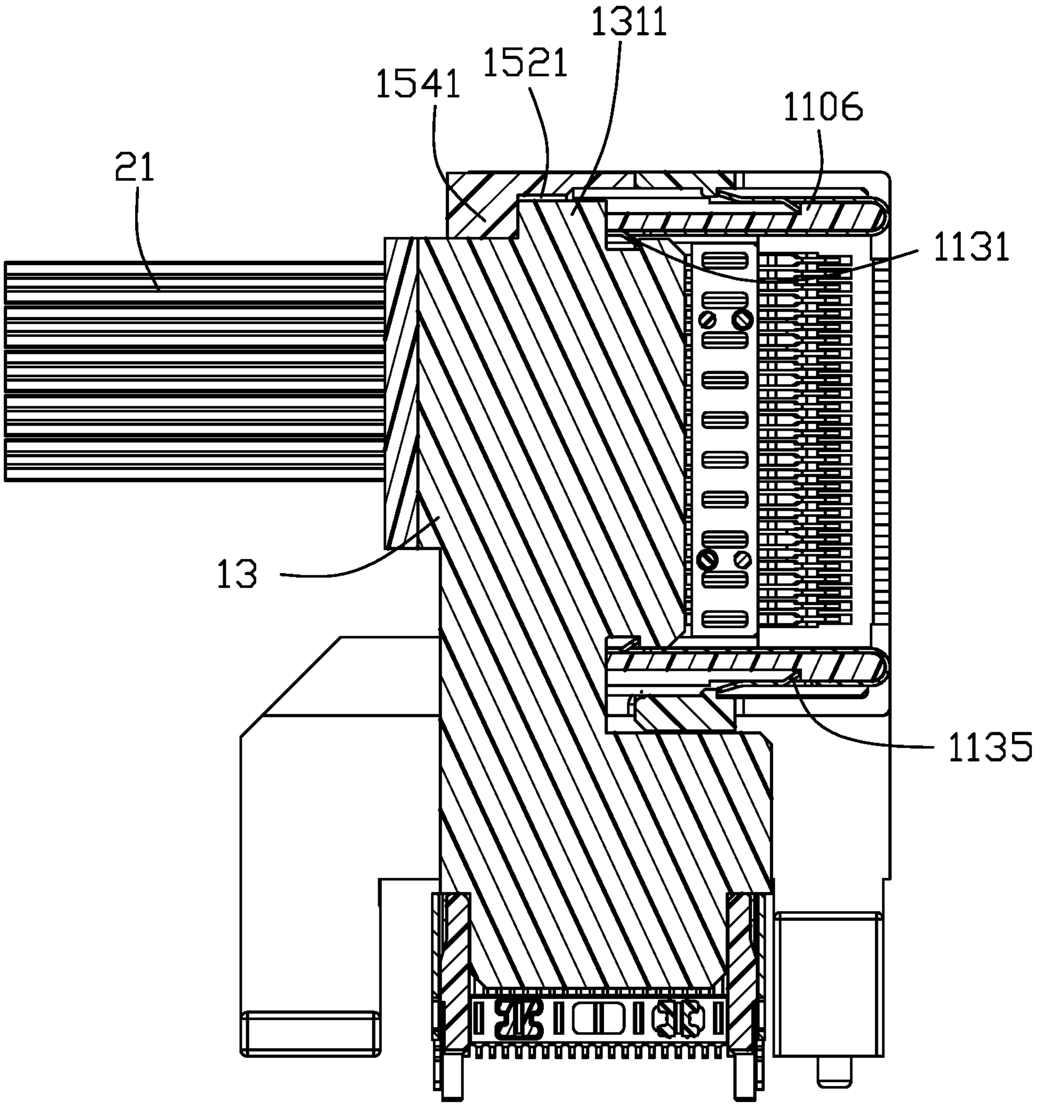
FIG. 7 is a cross-sectional view of the electrical connector assembly of FIG. 1 taken along line 7-7.
Figure 8:
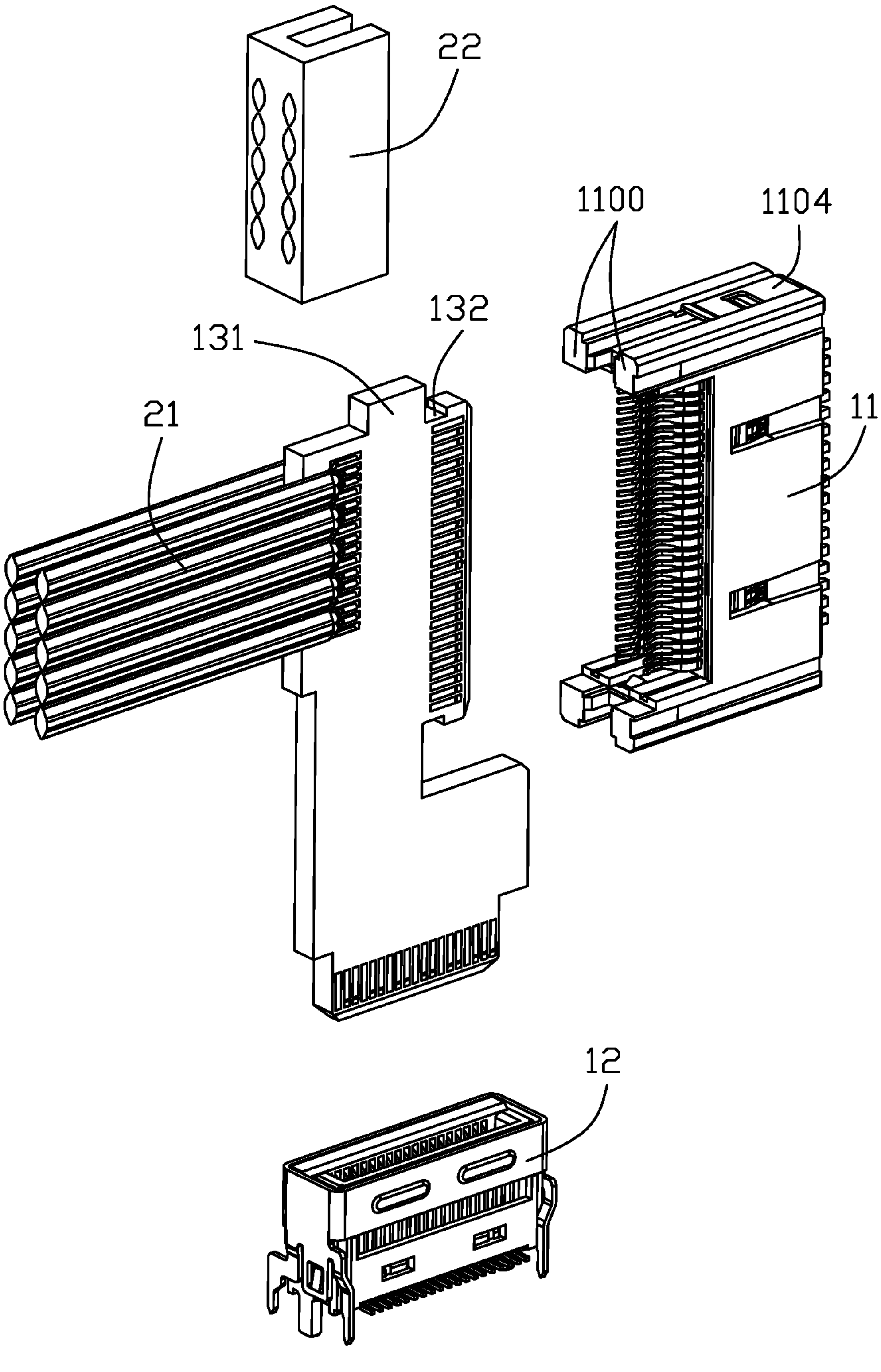
FIG. 8 is an exploded perspective view of the transmission unit of the electrical connector assembly of FIG. 4.
Figure 9:
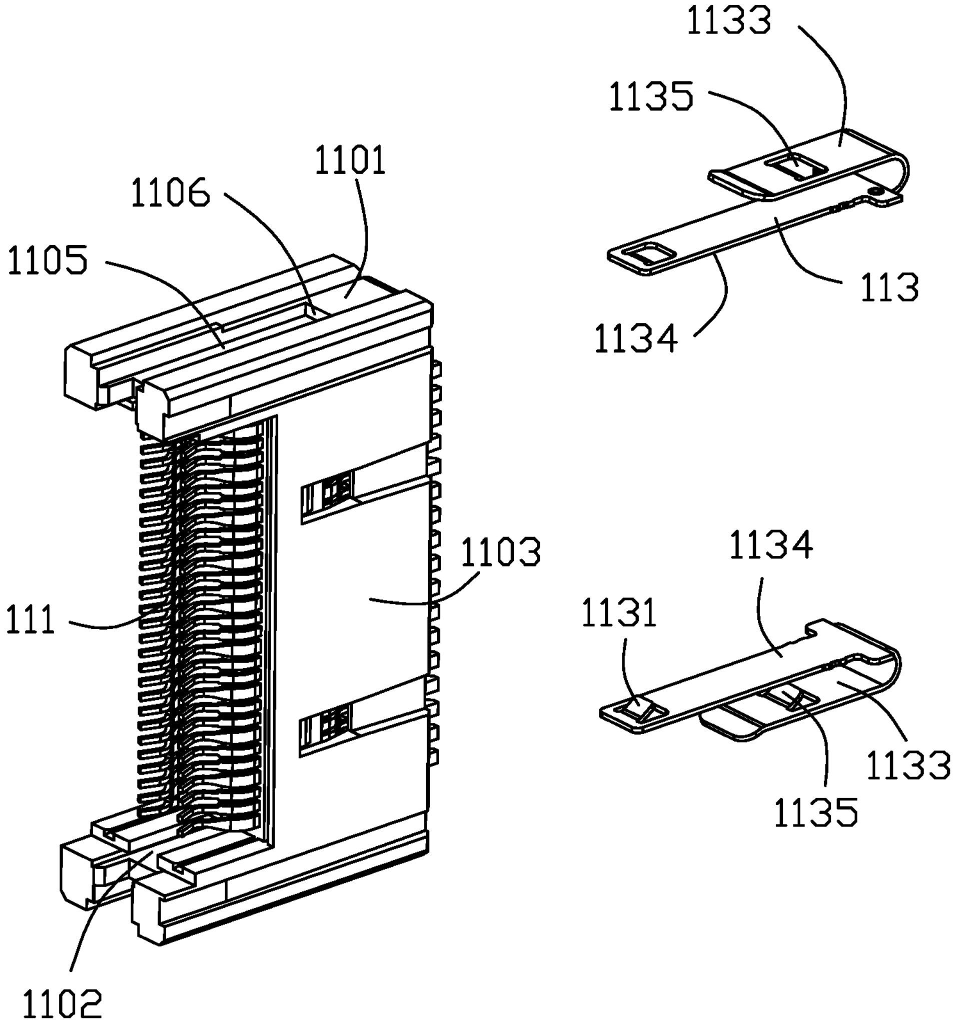
FIG. 9 is an exploded perspective view of the card edge connector of FIG. 8.

Referring to FIGS. 7 and 9, the card edge connector 11 further includes a pair of metal pieces 113 disposed in the rear card slot 111 and located at the upper end and the lower end of the rear card slot 111 respectively. The metal piece 113 is torn to form an elastic holding tab 1131 extending into the rear card slot 111. The circuit board 13 defines a recess portion 132 matched with the elastic holding tab 1131. The card insulative housing 110 includes an upper end wall 1101, a lower end wall 1102, and two side walls 1103 connecting the upper end wall 1101 and the lower end wall 1102. The upper end wall 1101, the lower end walls 1102 and the two side walls 1103 form the rear card slot 111 at a rear end and the front card slot 112 opposite to the rear card slot 111 at a front end. The metal piece 113 is substantially U-shaped, and includes an outer clamping piece 1133 and an inner clamping piece 1134. The metal pieces 113 are inserted into the card insulative housing 110 along the second direction and cover the upper and lower end walls 1101, 1102 respectively, and then, the inner clamping piece 1134 passes through the front card slot 112 and extends backward into the rear card slot 111, and the two outer clamping pieces 1133 are respectively accommodated in a pair of receiving grooves 1104 formed by the upper and lower end walls 1101, 1102 and the two side walls 1103. In this embodiment, in order to prevent the metal piece 113 from falling off the card insulative housing 110 when the metal pieces 113 are inserted, the receiving groove 1104 is further recessed inward at a position close to the rear end to form a sink groove 1105 with a stepped surface 1106. The outer clamping piece 1133 has a stop elastic tab 1135 extending into the sink groove 1105 and abutting against the stepped surface 1106. The first frame 14 further includes a clamping portion 146, extending downward and rearward from a bottom wall of the accommodating cavity 140, located on both sides of the circuit board 13. A guiding portion 1461 extends from the free end of the clamping portion 146 to guide the insertion of the circuit board 13. The setting of the clamping portion 146 not only facilitates the insertion of the circuit board, but also can clamp the circuit board 13 well.

Although the present invention has been described with reference to particular embodiments, it is not to be construed as being limited thereto. Various alterations and modifications can be made to the embodiments without in any way departing from the scope or spirit of the present invention as defined in the appended claims.

What is claimed is:

1. An electrical connector assembly comprising:

a first frame defining a plurality of accommodating cavities;

a plurality of transmission units partially received in the accommodating cavities, respectively, each of the transmission units comprising a card edge connector received in a corresponding accommodating cavity, a motherboard connector, and a circuit board connected with the card edge connector and the motherboard connector; and a second frame attached to the first frame; wherein the second frame presses against and holds the circuit boards in position.

2. The electrical connector assembly as claimed in claim 1, wherein the second frame presses against the card edge connectors.

3. The electrical connector assembly as claimed in claim 2, wherein the first frame has a first locking portion, and the second frame has a second locking portion locked with the first locking portion.

4. The electrical connector assembly as claimed in claim 1, wherein the first frame has a plurality of partition portions each defined between every two adjacent accommodating cavities, the plurality of partition portions define plural locking holes at a rear end thereof, the second frame comprises a longitudinal base and plural ribs extending downward from the longitudinal base, the ribs define plural locking hooks at a front end thereof, and the locking hooks are directly inserted and retained in the locking holes to abut against the partition portions.

5. The electrical connector assembly as claimed in claim 4, wherein the card edge connector comprises a card insulative housing and a plurality of terminals retained in the card insulative housing, the card insulative housing defines two pairs of support portions extends rearwards, the circuit board defines an upward-protruding portion sandwiched between a top pair of the two pairs of support portions, the second frame defines plural housing-stop faces and plural U-shaped grooves, the housing-stop faces press forward against the top pair of supporting portions, and the U-shaped grooves receive and limit the upward-protruding portions of the circuit board.

6. The electrical connector assembly as claimed in claim 5, wherein the second frame defines a recess opening forward and downward at the longitudinal base proximate to each side of the rib, and the housing-stop faces orient forward, the U-shaped grooves run through a corresponding housing-stop face and opening downwards, and the top pair of support portions are received in the recesses.

7. The electrical connector assembly as claimed in claim 5, wherein the card insulative housing defines a front card slot and a rear card slot received in the circuit board, and two U-shaped metal pieces are retained in the card insulative housing and simultaneously retained the circuit board.

8. The electrical connector assembly as claimed in claim 7, wherein the metal piece comprises a first elastic holding tab pressing forward against the card insulative housing and a second elastic holding tab pressing forward against a recess portion defined on the circuit board.

9. The electrical connector assembly as claimed in claim 8, wherein the first frame comprises plural pairs of clamping portions extending rearward into the receiving space to clamp respective lower front edges of the circuit boards.

10. The electrical connector assembly as claimed in claim 1, wherein a lower end of the circuit board is received in the motherboard connector and collectively in the receiving space.

11. An orthogonal electrical connector assembly comprising:

a first frame having a top sub-frame and two side walls extending downward to define therebetween a receiving space;

a plurality of vertical transmission units each including a circuit board, a card edge connector electrically and mechanically connecting with an upper front end of the circuit board, and a motherboard connector electrically and mechanically connecting with a bottom end of the circuit board, the card edge connectors being received in the accommodating cavities, respectively, and the circuit boards and the motherboard connectors received in the receiving space; and a second frame attached to the first frame to prevent the transmission units from falling off the first frame.

12. The orthogonal electrical connector assembly as claimed in claim 11, wherein the second frame presses forward against both the circuit board and the card edge connector.

13. The orthogonal electrical connector assembly as claimed in claim 11, wherein the first frame defines plural pairs of clamping portions extending into the receiving space to clamp respective lower front ends of the circuit boards.

14. The orthogonal electrical connector assembly as claimed in claim 11, wherein the card edge connector defines a pair of supporting portions, the circuit board defines an upward-protruding portion, the second frame defines plural recesses and U-shaped grooves, the U-shaped groove receives the upward-protruding portion, and the recesses receive the pair of supporting portions to prevent the circuit board and the card edge connector from falling off.

15. The orthogonal electrical connector assembly as claimed in claim 11, wherein the second frame defines plural locking hooks directly inserted and retained in corresponding locking holes defined on the first frame.

* * * * *